Patented Feb. 23, 1954

2,670,338

UNITED STATES PATENT OFFICE 2,670,338

SELF-HARDENING PLASTIC COMPOSITIONS AND SOLID POROUS BODIES PREPARED THEREFROM

Alvin M. Edmunds, Midland, Mich., assignor to The Dow Chemical Company, Midland, Mich., a corporation of Delaware No Drawing. Application March 24, 1951, Serial No. 217,397

15 Claims. (Cl. 260—38)

This invention concerns certain plastic compositions and a method of making the same. It pertains especially to plastic compositions which harden, on standing at room temperature, with formation of strong, acid-resistant, solid, porous bodies that are adapted for use as filter media, diffusion plates, or spargers, and for related purposes.

The plastic compositions of the invention comprise, as essential ingredients, an incompletely condensed thermosetting phenol-formaldehyde resin in a water-insoluble, liquid state, granules or particles of calcined petroleum coke, finer particles of an acid-resistant solid filler, and benzene sulphonyl chloride in the relative proportions hereinafter stated. The calcined petroleum coke, as its name implies, is ordinary petroleum coke that has been heated at high temperatures, e. g. in the order of from 800° to 1500° C., advantageously 1100° to 1400° C., to remove volatile components therefrom. It is a solid cellular material, comprising individually closed cells, and constitutes the aggregate in the compositions of the invention. The calcined petroleum coke particles, or granules, have good strength and are resistant to corrosive attack by acids and alkalies. They are readily wetted and firmly bonded together by the resin. The more finely divided solid filler serves to thicken, i. e. increase the viscosity of, the liquid phenol-formaldehyde resin and to plug minute pores or other openings in the coarser granules of the calcined petroleum coke aggregate. It thereby limits the extent of absorption of the liquid resin by the aggregate granules so that the latter are surface-wetted, and become bonded together, by the resin. Any of a wide variety of finely divided solid materials, such as sand, powdered silica, or quartz, etc., can be used as the filler, but powdered carbon, i. e. ordinary amorphous carbon, and powdered graphite are preferred. The benzene sulphonyl chloride serves as a catalyst, or condensing agent, to cause further condensation, i. e. hardening, of the phenolformaldehyde resin which functions as a binder for the particles, or granules, of the calcined petroleum coke. The liquid resin, having the filler admixed therewith, is used in amount such as to bond the coke granules together without completely filling the interstices between the granules. The porosity of the hardened article is due to the insterstices.

The compositions, when hardened, have good dimensional stability, possess good strength, and are resistant to the corrosive action of aqueous acids and salts, etc., other than strong oxidizing agents such as nitric or chromic acid. For instance, they are not damaged materially by prolonged contact with sulphuric acid of from 50 to 98 per cent concentration, even at temperatures as high as 175° C. They withstand large and rapid temperature changes without becoming cracked or shattered. However, for obtainment of a hardened porous article having these desirable properties, it is important that the abovementioned starting materials, particularly the calcined petroleum coke and benzene sulphonyl chloride, be employed.

Although numerous materials are known which perform functions of the general types accomplished by the respective essential ingredients mentioned above, and the compositions of the invention may contain other materials in addition to said essential ingredients, no material has been found which may satisfactorily be substituted in place of the calcined petroleum coke, or the benzene sulphonyl chloride, to obtain a hardened porous body having the good strength, high acid resistance, thermal shock resistance, and the dimensional-stability that are possessed by the solid porous bodies prepared in accordance with the invention. For instance, the substitution of other kinds of aggregates, e. g. silica pebbles, brick chips, or ordinary foundry coke obtained from coal, in place of the calcined petroleum coke results in formation of a hardened porous body having considerably less strength and less resistance to corrosion by aqueous mineral acid solutions than are possessed by the hardened porous compositions of the invention. The reason for the change in properties of the hardened compositions with change in the kind of aggregate employed is not fully understood, but it is evident that the resin forms a stronger and more permanent bond with calcined petroleum coke than with most other kinds of hard, strong, granular materials. Substitution of para-toluene sulphonyl chloride, hydrochloric acid, sulphuric acid, or other known catalysts for the hardening of phenolformaldehyde resins, in place of the benzene sulphonyl chloride which is required by the invention, results in formation of a hardened porous body which becomes corroded to a considerable extent during prolonged contact with aqueous solutions of strong mineral acids, particularly during contact with aqueous sulphuric acid solutions of greater than 50 per cent concentration. Also, such substitution results in production of hardened porous articles which usually continue to undergo appreciable volume changes, i. e. swelling or shrinking, for several months after being formed. As a result of such volume changes, usually shrinkage, the porous phenolformaldehyde resin bodies formed by means of catalysts other than benzene sulphonyl chloride often develop cracks on standing.

Although no substances are known which may satisfactorily be used in place of the calcined petroleum coke and the benzene sulphonyl chloride ingredients of the compositions of the invention, the self-hardening plastic compositions may contain various ingredients in addition to those that are required. For instance, the liquid phenol-formaldehyde resin ingredient, although substantially insoluble in water, usually contains from 18 to 35 per cent by weight of water dissolved therein. Furthermore, together with the benzene sulphonyl chloride there may be used other catalysts, or condensing agents, such as hydrogen chloride, or trichloroacetic acid, etc. Mixtures of trichloroacetic acid and benzene sulphonyl chloride, containing at least 40 per cent by weight of the latter, are well suited for use as resin-hardening catalysts.

As the resin ingredient, any thermosetting phenol-formaldehyde resin, in a water-insoluble liquid state, may be employed. In general, such resins are prepared by condensation of one molecular equivalent of phenol with between 1 and 2.5, preferably between 1.4 and 1.5, molecular equivalents of formaldehyde and discontinuing the condensation reaction when the product becomes water-insoluble, but remains liquid. Procedures for making such liquid phenol-formaldehyde condensation products (which, though liquid, are commonly termed resins) are well known and need not be given in detail. However, the condensation reaction is preferably started under alkaline conditions, e. g. using from 1 to 2 per cent by weight of sodium hydroxide, potassium hydroxide, sodium carbonate, or other alkali as catalyst and is carried out at temperatures in the order of from 40° to 70° C. to a point at which the product is a fairly thin, water-soluble liquid. The mixture is then acidified by adding a strong aqueous mineral acid such as hydrochloric or sulphuric acid, etc., and the reaction is continued at similar temperatures until the mixture becomes fairly viscous and is water-insoluble. The reaction is stopped short of the solidification point, since the liquid resin is conveniently used in preparing the compositions of the invention. When the reaction has been carried to the desired stage, the mixture is treated with an alkali, e. g. with an aqueous solution of NaOH, NH$_3$, KOH, Na$_2$CO$_3$, or K$_2$CO$_3$, etc., to bring it to a pH value of from 3 to 7 and is washed thoroughly with water. The product, although substantially insoluble in water usually retains a considerable amount, e. g. from 18 to 35 per cent by weight, of dissolved water. It usually has a viscosity of from 300 to 2,000 centipoises at 25° C., but may be of lower or higher viscosity. It may be used directly as an ingredient of the compositions of the invention, or it may be aged to further increase its viscosity, in cases where the initial viscosity is undesirably low, prior to such use.

The water which usually remains dissolved in the liquid phenol-formaldehyde resin after preparation of the latter serves as a diluent to extend the covering power of the resin in surface-treating the calcined petroleum coke granules. Accordingly, the proportions of the liquid resin-containing condensation product required for the purpose do not vary greatly with change in its water content, and the proportions of resin hereinafter stated are inclusive of any water contained therein.

By varying the relative proportions of the aforementioned ingredients, particularly of the liquid resin and calcined petroleum coke, in the plastic composition, the porosity of composition after hardening may be varied in a predetermined manner. Further variations in the porosity of the product may be obtained by changes in the sizes of the coke granules employed in preparing the same. In general, the porosity increases with increase in the average size of the coke granules and decreases with increase in ratio by weight of liquid resin to granular coke of a given size employed in preparing the plastic composition. The coke granules may be of sizes ranging from 48 mesh to 2 mesh size or larger, based on the Tyler screen scale, but usually are of from 5 to 10 mesh size. The filler, which is used to thicken the liquid resin and to plug any pores in the coke granules, is usually a graded material of from 50 to 400 mesh particle size or finer.

The proportions of filler which may most advantageously be used for thickening the liquid resin vary somewhat with changes in the initial viscosity of the resin and with changes in the kind and average particle size of the filler employed. In general, the filler is added to the liquid resin, or to the mixture of a hardening agent, e. g. benzene sulphonyl chloride, and such resin, in a proportion such that when a cylinder, open on both ends and of 1⅝ inches internal diameter and 2 inches height, is placed on a horizontal glass plate and filled with the thickened resin, and the cylinder then removed, and contents adhering to the cylinder are scraped therefrom and added to resin adhering to the plate, the resultant column of the thickened resin spreads at a rate such that it has an average diameter of between 2½ and 7 inches, preferably between 3 and 5 inches, one minute after removal of the cylinder, and an average diameter of not more than 7, preferably not more than 5½ inches, 15 minutes after removal of the cylinder. By an average diameter is meant the average of two measurements of the diameter taken at a right angle to one another. In most, if not all, instances, the proportions of filler required to thicken the liquid phenol-formaldehyde resin so that the resultant mixture, not containing the aggregate, possesses the above flow rates are within the limits hereinafter given.

The following formulas give the relative proportions, in per cent by weight, of the several essential ingredients in two plastic compositions prepared using calcined petroleum coke of from 5 to 10 mesh grain size; one of which compositions hardens to form a highly porous article and the other of which hardens to form a finely porous article which is only slightly permeable to water.

| Ingredients of Plastic Composition, Percent by Wt. | | | | Porosity of Hardened Article |
|---|---|---|---|---|
| Calcined Petroleum Coke | Liquid Resin | Filler | Catalyst | |
| 75 | 11.0 | 12.6 | 1.4 | Highly Porous. |
| 41.6 | 23.1 | 31.5 | 3.8 | Porous, but nearly impervious. |

As hereinbefore indicated, the catalyst in each of the above formulas may be benzene sulphonyl chloride alone, or a mixture of at least 40 per cent by weight of benzene sulphonyl chloride together with 60 per cent or less of other resin-hardening catalysts, e. g. trichloroacetic acid. The filler may be any solid, inert material in finely divided form, but is preferably powdered carbon, i. e. ordinary amorphous carbon, or graphite. In general, the plastic compositions of the invention contain the several ingredients in proportions within the limits represented by the above formulas, the optimum proportions in a given instance being dependent upon the average grain size of the coke, the kind of filler employed, and the degree of porosity desired in the compositions when hardened.

In order to obtain hardened articles of about the same tensile strength from successive batches of the plastic composition prepared from similar starting materials, except for a change in mesh size of the calcined petroleum coke used in the different batches, the proportion of the coke, relative to the other ingredients, should be decreased, within the above-stated limits, with decrease in the average size of the coke granules. A decrease in size of the coke granules employed in making the plastic composition results in rendering the hardened compositions more finely porous.

Within the aforestated general range of proportions in which the several ingredients may be employed in preparing the plastic compositions of the invention, the preferred ranges of proportions vary somewhat with changes in the kind of filler employed. For instance, when using powdered graphite, or powdered carbon as the filler, the several ingredients of the plastic composition are advantageously employed in proportions within the limits expressed by the following formulas for plastic compositions which, when hardened, form highly porous, and porous but nearly impervious, articles, respectively.

| Ingredients of Plastic Composition | | | | Porosity of Hardened Article |
|---|---|---|---|---|
| Calcined Petroleum Coke, Wt. Percent | Liquid Resin, Wt. Percent | Graphite of Carbon as Filler, Wt. Percent | Catalyst, Wt. Percent | |
| 75 | 11.0 | 12.6 | 1.4 | Highly Porous. |
| 48.8 | 23.1 | 24.3 | 3.8 | Nearly Impervious. |

When using powdered silica as the filler, the plastic compositions advantageously contain their several ingredients in relative proportions within the limits expressed by the following formulas:

| Ingredients of Plastic Composition | | | | Porosity of Hardened Article |
|---|---|---|---|---|
| Calcined Petroleum Coke, Wt. Percent | Liquid Resin, Wt. Percent | Powdered $SiO_2$, Wt. Percent | Catalyst, Wt. Percent | |
| 68.6 | 11.0 | 19 | 1.4 | Highly Porous. |
| 50.0 | 16.9 | 30.7 | 2.4 | Nearly Impervious. |

Although benzene sulphonyl chloride may be used as the only catalyst in any of the plastic compositions of the invention, mixtures of trichloracetic acid with 40 per cent by weight or more of benzene sulphonyl chloride frequently cause hardening of the plastic compositions to form porous articles having a greater dimensional stability than are obtained when using benzene sulphonyl chloride alone as the catalyst. This is particularly the case when employing powdered silica as the filler for the plastic compositions. Peculiarly, trichloroacetic acid alone, although effective in catalyzing hardening of the resin ingredient, causes formation of porous articles which are severely corroded during prolonged contact with aqueous acids, especially concentrated sulphuric acid, and is not satisfactory for the purpose of the invention. Benzene sulphonyl chloride alone, and the mixtures thereof with 60 per cent by weight or less of trichloroacetic acid, are effective as catalysts for hardening the compositions to form strong, acid-resistant, porous articles.

The optimum proportions of catalyst in the plastic compositions, and the relative proportions of benzene sulphonyl chloride and trichloroacetic acid which may most advantageously be present in the catalyst, vary somewhat depending upon whether powdered silica, or either powdered carbon or powdered graphite, is used as the filler ingredient of the composition. When using powdered carbon, or powdered graphite, or a mixture thereof, as the filler, there is preferably employed from 1.4 to 3.8 per cent by weight of a catalyst consisting predominantly of benzene sulphonyl chloride, but which may contain up up to 60 per cent by weight of trichloroacetic acid. When using powdered silica as the filler, there is preferably employed, as the catalyst, from 1.4 to 2.4 per cent by weight of a mixture of from 45 to 75 parts by weight of benzene sulphonyl chloride and from 55 to 25 parts of trichloroacetic acid.

The hardened compositions containing powdered carbon or graphite as the filler are usually stronger and more resistant to corrosive attack by acids and alkalies than are the compositions containing silica as the filler. However, the compositions containing silica as a filler possess good strength and good acid-resistance and can be manufactured at lower cost than those containing graphite or carbon as the filler. Products having properties intermediate of those of the respective articles just mentioned may be obtained by using mixtures of silica and carbon and/or graphite as the filler. In practice, powdered graphite, or powdered carbon, or a mixture thereof is preferred.

The manner in which the aforementioned ingredients are admixed may be varied somewhat, but the ease of mixing to obtain a substantially uniform plastic composition varies with changes in the order and manner of bringing the ingredients together. It is important that the catalyst and the liquid phenol-formaldehyde resin be admixed shortly before the plastic composition is troweled, rolled, tamped, or otherwise shaped, since the catalyst causes fairly rapid hardening of the resin. It is also important that the filler be admixed with the resin prior to adding the granular calcined petroleum coke. Otherwise, the coke absorbs an excessive amount of the resin. Furthermore, it is important that the coke be added in large portions to the mixture of the resin, filler, and catalyst, with stirring between the additions, since otherwise the mixture tends to form balls, or agglomerates, which are difficult to break up so as to obtain a uniform composition. Usually, from ¼ to ½, preferably about ⅓, of the coke is added to a mixture of the other ingredients and is stirred into the mixture. Thereafter, the remainder of the coke is added in large portions with stirring. In practice, it has been found most satisfactory to add the coke as from three to four about equal-sized portions with stirring of the mixture after each addition.

Except for the precautions just mentioned, the manner of mixing the ingredients may be varied considerably. Usually, the catalyst is admixed with the liquid resin, after which the filler is added to thicken the resin. The calcined petroleum coke is then added. Alternatively, the filler may be wetted with the catalyst and thereafter be admixed with the resin. The mixture of filler and catalyst may be stored, or shipped to a point of use, and when desired be mixed with the other ingredients.

The plastic composition solidifies and hardens at room temperature in a period of from about ½ hour to several hours after it is formed. Hardening may be accelerated by warming the mixture. It is, of course, important that the operations of forming and shaping the mixture be completed before hardening occurs. The plastic composition may be shaped by usual operations such as troweling, rolling, or tamping, etc. During troweling, the trowel, or other tool may advantageously be wiped from time to time with a cloth moistened with alcohol, or other solvent for the resin. This prevents sticking of the composition to the tool. Prior to rolling or tamping the composition, the latter may be covered with a flexible metal sheet, e. g. of iron, coated on the underside with petrolatum, or the like, to prevent sticking. After the rolling or tamping operation, the sheet is removed and the composition permitted to harden in place.

Once hardened, the composition does not undergo further shrinkage or swelling to an objectionable extent. Because of its dimensional stability, when hardened, and its resistance to the corrosive action of aqueous mineral acids such as hydrochloric, hydrobromic, or sulphuric acid, the plastic compositions of the invention are well adapted for formation of large filter plates or diffusion walls, e. g. of sizes up to 5 feet square or larger, such as may be used in the bottom of tanks. The hardened compositions containing graphite or carbon as the filler are not only acid-resistant, but possess good resistance to the corrosive action of dilute aqueous alkalies, provided conditions are alternately acidic and alkaline. Regardless of the kind of filler employed, the hardened porous articles prepared in accordance with the invention have good tensile strength, e. g. in the order of from 85 to 1000 pounds per square inch or higher. Such articles prepared under the preferred conditions hereinbefore given, usually have a tensile strength in the order of from 700 to 1000 pounds per square inch.

The following examples describe a number of ways in which the invention has been practiced, and illustrate certain of its advantages, but are not to be construed as limiting its scope.

EXAMPLE 1

This example illustrates the preparation of a liquid, water-immiscible, phenol-formaldehyde resin suitable for use as an ingredient of the compositions of the invention. A mixture of 44.5 parts by weight of phenol, 55.5 parts of an aqueous formaldehyde solution of 37 weight per cent concentration, and 1.5 parts of sodium hydroxide was reacted at 60° C. for 6 hours. At this stage of the reaction, the liquid condensation product was water-soluble. The mixture was then acidified by addition of 33 cc. of aqueous sulphuric acid, of 30 per cent concentration, per pound of the mixture to which the acid was added. The acidified mixture was agitated, while warmed to about 40° C. for from 2 to 3 hours. The aqueous and organic layers of the mixture were separated. The organic layer was neutralized to a pH value of from 3.4 to 7.0 by treatment with sodium hydroxide, and washed thoroughly with water. The water-insoluble, liquid phenol-formaldehyde condensation product, thus obtained, retained from 18 to 35 per cent of water dissolved therein.

EXAMPLE 2

Approximately 2.34 parts by weight of benzene sulphonyl chloride was dissolved in 19.16 parts of a liquid phenol-formaldehyde condensation product similar to that described in Example 1. The solution was thickened by admixing therewith 21.5 parts of graded graphite powder ranging from 50 to 400 mesh particle size. To the resultant mixture there was added, as three approximately equal-sized portions, 57 parts of calcined petroleum coke in the form of granules of from 5 to 10 mesh size. The mixture was stirred thoroughly during and after each such addition. The resultant plastic composition was shaped into plates, bars and briquettes which, after becoming hardened, would be suitable for use in determining properties of the composition. The test plates were of 1 inch thickness. The test bars were of 1 inch square cross section and of approximately 10 inches length. Each briquette was 1 inch thick and of 1 inch square cross section at the midpoint of its length. The end portions of the briquettes were widened in a tapered manner to permit gripping of the same. After being formed, the test pieces hardened on standing at room temperature for from 3 to 5 hours. When a test bar had stood at room temperature for about 24 hours after becoming hardened, its length was measured. The bar was then permitted to stand for 30 days and its length was again measured. It was found that the bar had shrunk by only 0.104 per cent of its original length during the 30 days of standing, i. e. the hardened bar possessed good dimensional stability. Thirty days after it had been formed and hardened, a briquette of the composition was tested to determine its tensile strength. It was found to have a tensile strength of 915 pounds per square inch of cross section at the point of breakage. Thirty days after they had been formed and hardened, two test plates of the composition were separately tested to determine their permeability to water. In each test, water, under a pressure corresponding to a head of 1 foot of water, was fed to a measured area of one face of a plate, and the rate of flow of water through the thickness of the plate was measured. The permeability values thus found for the two plates, each of 1 inch thickness, were 17.34 and 18.2 gallons of water per minute per square foot of plate area, respectively.

EXAMPLE 3

A number of plastic compositions were prepared as described in Example 2, except that the relative proportions of the several starting materials were varied from one composition to another. Each composition was shaped into test plates and briquettes, as in Example 2, and the test pieces permitted to harden. Seven days after being formed and hardened, the briquettes were tested to determine the tensile strength. Thirty days after being formed and hardened the plates were tested, as in Example 2, to determine their permeability to water. The following table gives the relative proportions, in per cent by weight, of the liquid phenolformaldehyde condensation product, the benzene sulphonyl chloride, the powdered graphite and the calcined petroleum coke used in preparing each composition. It also gives the tensile strength, in pounds per square inch, and the water-permeability, in gallons of water per minute per square foot of area of a test plate, determined for each composition. In the table, the phenol-formaldehyde condensation product is referred to as a "P. F. resin."

*Table I*

| Run No. | Ingredients of Composition, Percent by Wt. | | | | Hardened Composition | |
|---|---|---|---|---|---|---|
| | P. F. Resin | Benzene Sulphonyl Chloride | Powdered Graphite | 5-10 Mesh Calcined Petroleum Coke | Tensile Strength, lbs./sq. in. | Water-Permeability gal./min./sq. ft. |
| 1 | 20.04 | 2.45 | 22.51 | 55 | 949 | 12.0 |
| 2 | 17.82 | 2.18 | 20.0 | 60 | 622 | 40.4 |
| 3 | 15.60 | 1.90 | 17.5 | 65 | 358 | 55.7 |
| 4 | 11.13 | 1.36 | 12.51 | 75 | 85 | 81.9 |

EXAMPLE 4

A number of plastic compositions were prepared as described in Example 2, except that the hardening agent employed in each composition was a mixture of trichloroacetic acid and benzene sulphonyl chloride, instead of the latter alone, and that the relative proportions of the several starting materials were varied from one composition to another. Each composition was shaped into plates, bars and briquettes for use in determining its properties and the test pieces were permitted to harden and were used to determine the tensile strength, the per cent shrinkage in a period of thirty days after hardening, and the water-permeability of the composition, as in Example 2. The tensile strength and water-permeability values were determined using test pieces that had stood thirty days after hardening. Table II names and gives the relative proportions, in per cent by weight, of the several ingredients used in preparing each composition. It also gives the properties which were determined for the hardened composition. In the table, the liquid phenol-formaldehyde condensation product is referred to as "P. F. resin."

*Table II*

| Run No. | Ingredients of Composition, Percent by Wt. | | | | | Hardened Composition | | |
|---|---|---|---|---|---|---|---|---|
| | P. F. Resin | Benzene Sulphonyl Chloride | Trichloroacetic acid | Powdered Graphite | 5-10 Mesh Calcined Petroleum Coke | Tensile Strength, lbs./sq. in. | 30 Days, Percent Shrinkage | Water-Permeability, gal./min./sq. ft. |
| 1 | 19.55 | 2.52 | 0.86 | 22.07 | 55.0 | 960 | 0.068 | 7.5 |
| 2 | 18.66 | 2.40 | 0.83 | 21.11 | 57.0 | 915 | 0.040 | 28.5 |
| 3 | 17.38 | 2.24 | 0.77 | 19.61 | 60.0 | 605 | 0.150 | 36.6 |
| 4 | 15.20 | 1.96 | 0.67 | 17.17 | 65.0 | 365 | 0.105 | 62.3 |
| 5 | 13.0 | 1.68 | 0.57 | 14.75 | 70.0 | 180 | 0.077 | (¹) |
| 6 | 10.86 | 1.40 | 0.48 | 12.26 | 75.0 | 95 | (¹) | 95.0 |

¹ Not determined.

EXAMPLE 5

Two plastic compositions were prepared as in Example 2, except that powdered silica of from 80 to 400 mesh size and finer, instead of powdered graphite, was used as a filler and that the relative proportions of the several ingredients were varied from one composition to the next. The plastic compositions were shaped into test pieces which hardened on standing for from 3 to 5 hours. Thirty days after being formed and hardened, the test pieces were employed in determining the tensile strength and water-permeability of each composition, as in Example 2. Table III names and gives the relative proportions, in per cent by weight, of the ingredients of each composition. It also gives the tensile strength and the water-permeability values found for the hardened composition.

*Table III*

| Run No. | Ingredients, Percent by Wt. | | | | | Hardened Composition | |
|---|---|---|---|---|---|---|---|
| | P. F. Resin | Benzene Sulphonyl Chloride | Trichloroacetic Acid | Powdered SiO$_2$ | 5-10 Mesh Calcined Petroleum Coke | Tensile Strength, lbs./sq. in. | Water-Permeability, gal./min./sq. ft. |
| 1 | 15.23 | 1.23 | 0.91 | 27.63 | 55.0 | 505 | 23.15 |
| 2 | 14.55 | 1.18 | 0.87 | 26.40 | 57.0 | 515 | 30.8 |

EXAMPLE 6

In each of four sets of experiments, a number of plastic compositions (which, when hardened, were of close to the same degree of porosity but which differed from one another as to the kind of agregate employed therein) were prepared, shaped into test pieces, hardened, and tested for tensile strength and permeability to water. The procedures in carrying out these operations were as described in the preceding examples, particularly Example 2. In order to form articles of close to the same degree of porosity from compositions containing different kinds of aggregates, it was necessary to vary the relative proportions of the several starting materials used in making the compositions and, in some instances to change somewhat the average grain size of aggregate material in substituting one kind of an aggregate for another. Table IV names, and gives the proportions in per cent by weight of, the ingredients used in making each composition. It indicates the range of sizes of the granule of aggregate used in each composition. The table gives the water-permeability value and the tensile strength of each hardened composition. The tensile strength values were determined seven days after hardening of the compositions. In the table, "P. F. resin" pertains to the liquid phenol-formaldehyde condensation product employed in preparing the compositions and "Calc. Pet. Coke" is an abbreviation of calcined petroleum coke.

maintained at a temperature of 90° C. throughout this period. The briquette was then removed from the bath and, after acid had drained therefrom, washed with water, and tested for tensile strength. The table gives the tensile strength of each composition before and after immersion in the acid and the per cent change in tensile strength which occurred during immersion in the acid. An increase in tensile strength is indicated by a plus sign and a decrease by a minus sign. The abbreviations "P. F. resin" and "Calc. Pet. Coke" have the same meanings as in preceding examples.

Table V

| Run No. | Ingredients, Percent by Wt. | | | | | | Tensile Strength | | |
|---|---|---|---|---|---|---|---|---|---|
| | P. F. Resin | Benzene Sulphonyl Chloride | Trichloro-acetic Acid | Filler | | Calc. Pet. Coke | Before Acid Treatment, lbs./sq. in. | After Acid Treatment, lbs./sq. in. | Percent Change |
| | | | | Kind | Pts. | | | | |
| 1 | 20.05 | 2.45 | None | Graphite | 22.5 | 55.0 | 730 | 772 | +5.4 |
| 2 | 21.38 | 2.62 | None | ...do | 16.0 | 60.0 | 614 | 482 | −21.5 |
| 3 | 21.54 | 1.35 | 1.86 | ...do | 20.25 | 55.0 | 924 | 763 | −17.4 |
| 4 | 24.05 | 2.95 | None | SiO₂ | 18.0 | 55.0 | 660 | 749 | −13.5 |
| 5 | 15.53 | None | 2.74 | ...do | 26.73 | 55.0 | 588 | 308 | −47.6 |
| 6 | 11.90 | None | 2.10 | ...do | 26.0 | 60.0 | 197 | 132 | −33.0 |

EXAMPLE 8

A number of plastic compositions were prepared by dissolving a minor amount of benzene sulphonyl chloride in separate portions of a liquid phenol-formaldehyde condensation product, similar to that described in Example 1, and thickening each solution by admixing powdered graphite of from 50 to 400 mesh particle size therewith. To each of the thickened solutions, a granular aggregate, of between 4 and 10 mesh grain sizes, was added in three equal portions with stirring of the mixture during and after each addition. The compositions differed from one another as to the kind of aggregate employed and as to the relative proportions in which the several starting materials were used. Each plastic composition was shaped into briquettes, as described in Example 2. The briquettes hardened on standing at room temperature for from 3 to 5 hours. Approximately a week after it was formed and hardened, a briquette of each composition was tested for tensile strength. Another hardened briquette of the same composition was immersed in a heated bath of an aqueous hydrochloric acid solution of 20 per cent concentration and was maintained in the bath for 30 days. Throughout this period, the bath was heated at a temperature of 110° C. At the end of said period, the briquette was removed Table IV

| Run No. | Ingredients, Percent by Wt. | | | | | | | Hardened Composition | |
|---|---|---|---|---|---|---|---|---|---|
| | P. F. Resin | Benzene Sulphonyl Chloride | Trichloro-acetic Acid | Graphite | Aggregate | | | Water-Permeability, gal./min./sq. ft. | Tensile Strength, lbs./sq. in. |
| | | | | | Kind | Mesh Sizes | Amount | | |
| I-a | 19.16 | 2.34 | | 21.5 | Calc. Pet. Coke | 5-10 | 57.0 | 17.77 | 958 |
| I-b | 11.58 | 1.42 | | 13.0 | SiC | 4-6 | 74.0 | 19.46 | 510 |
| I-c | 9.26 | 1.13 | | 10.37 | Quartz | 4-6 | 79.24 | 17.30 | 206 |
| II-a | 18.66 | 2.40 | 0.83 | 21.11 | Calc. Pet. Coke | 5-10 | 57.0 | 28.5 | 1125 |
| II-b | 11.35 | 1.45 | 0.50 | 12.7 | Brick Chips | 5-10 | 74.0 | 28.2 | 359 |
| II-c | 8.23 | 1.00 | | 9.23 | Fused MgO | 4-8 | 81.54 | 28.3 | 229 |
| II-d | 13.4 | 1.64 | | 15.06 | Al₂O₃ | 4-6 | 69.9 | 26.7 | 96 |
| III-a | 17.82 | 2.18 | | 20.0 | Calc. Pet. Coke | 5-10 | 60.0 | 40.4 | 550 |
| III-b | 6.88 | 0.84 | | 7.72 | SiO₂ Pebbles | 4-6 | 84.56 | 38.0 | 127 |
| IV-a | 15.60 | 1.91 | | 17.5 | Calc. Pet. Coke | 5-10 | 65.0 | 55.7 | 447 |
| IV-b | 20.05 | 2.44 | | 22.5 | Foundry Coke | 5-10 | 55.0 | 63.1 | 205 |

EXAMPLE 7

This example is presented to illustrate the stability which the hardened compositions of the invention possess against detrimental attack by sulphuric acid at an elevated temperature. For comparative purpose, the example includes tests of compositions which were prepared without use of benzene sulphonyl chloride and are therefore outside the scope of the invention, but are otherwise similar to the compositions of the invention. Table V names and gives the relative proportions, in per cent by weight, of the ingredients used in each composition. Except for the kinds and proportions of the starting materials employed, the procedures in preparing each composition, in making briquettes of the composition for use in determining its properties, and in testing the hardened briquettes for tensile strength were as described in Example 2. Seven days after it was prepared and hardened, a briquette of each composition was tested for tensile strength. Another briquette of the same composition was immersed for 30 days in a bath of sulphuric acid of 86 per cent concentration, which bath was from the bath, washed with water, and tested for tensile strength. Table VI names and gives the relative proportions, in parts by weight, of the several ingredients used in preparing each composition. It also gives the tensile strength, in pounds per square inch of cross section of each hardened composition both before and after the treatment with acid. The table gives the per cent by which the tensile strength of each composition was changed by the treatment with acid. In the table, an increase in tensile strength is indicated by a plus sign and a decrease in strength is indicated by a minus sign.

*Table VI*

| Run No. | Ingredients, Percent by Wt. | | | | | Tensile Strength | | |
|---|---|---|---|---|---|---|---|---|
| | P. F. Resin | Benzene Sulphonyl Chloride | Graphite | Aggregate | | Before Acid Treatment, lbs./sq. in. | After Acid Treatment, lbs./sq. in. | Percent Change |
| | | | | Kind | Amount | | | |
| 1 | 20.05 | 2.45 | 22.5 | Calc. Pet. Coke | 55.0 | 949 | 1163 | +22.5 |
| 2 | 19.15 | 2.35 | 21.5 | Foundry Coke | 57.0 | 245 | 266 | +8.6 |
| 3 | 11.58 | 1.42 | 13.0 | Brick Chips | 74.0 | 566 | 344 | −39.3 |
| 4 | 9.25 | 1.13 | 10.38 | Quartz | 79.24 | 222 | 143 | −35.6 |
| 5 | 9.18 | 1.12 | 10.30 | Silicon Carbide | 79.4 | 291 | 100 | −65.6 |
| 6 | 8.23 | 1.00 | 9.23 | Fused MgO | 81.54 | 295 | 58.7 | −80.1 |
| 7 | 6.88 | 0.84 | 7.72 | Crystalline Al₂O₃ | 84.56 | 237 | 45 | −81.0 |

EXAMPLE 9

This example shows use of a large filter plate, prepared in accordance with the invention, as the bottom of a chamber for treatment of a crude sulphonation mixture. The filter plate is used for flow of liquors to and from the chamber at temperatures which vary widely at different stages in the treatment. Also, the treatment is one which involves consecutive passage of concentrated sulphuric acid, diluted sulphuric acid, water, and an aqueous alkali solution through the filter plate. For purpose of comparison, this example includes data collected during an earlier use, in the same treatment, of a filter plate of similar size and shape, but not prepared in accordance with the invention. Each of the filter plates was in the form of a panel having channels connecting with a valved main pipe which extended through a wall of the chamber and served for flow of liquids to and from the chamber. Each panel was 4½ inches thick and was in the form of a 6 foot x 6 foot square. Such panel, which served as a pervious bottom for the chamber, rested on an impervious, corrosion-resistant base. The filter plate which was first used, and was not made in accordance with the invention, was made by admixing calcined petroleum coke of from 5 to 10 mesh size with a mixture of a liquid phenol-formaldehyde resin and a filler (having a catalyst, i. e. a resin-hardening agent, admixed therewith) which had been purchased on the market. The catalyst which it contained was not benzene sulphonyl chloride. In making the second filter plate, a plastic composition was prepared in accordance with the invention by mixing 2.34 parts by weight of benzene sulphonyl chloride with 19.16 parts of a liquid phenol-formaldehyde condensation product, similar to that described in Example 1, and thickening the mixture by adding 21.5 parts of powdered graphite of from 50 to 400 mesh size. Fifty-seven parts of granular calcined petroleum coke of from 5 to 10 mesh size was added in three equal portions with stirring during and after each addition. A 4½ inch layer of the resultant plastic composition was spread at the bottom of the chamber around removable inserts which formed the channels connecting with a center outlet pipe. After leveling the composition, the layer was tamped in place. The layer hardened on standing for about 3 hours at room temperature. About one week after thus forming the filter plate as a bottom to the treating chamber, the inserts were removed to clear the channel passages, and the chamber was placed in service. The treatment involves filling the chamber with a crude sulphonation mixture consisting of a slurry of a solid sulphonated hydrocarbon material in sulphuric acid of about 86 per cent concentration. The slurry is at a temperature of about 70° C. when fed to the chamber. The acid is drained from the sulphonated product through the filter plate and the center outlet pipe embedded therein. Vacuum is applied to aid in removing the acid. When most of the acid has been removed, water is sprayed from above onto the sulphonated material and the resultant dilute sulphuric acid solution is, at the same time, drained from the mixture through the filter plate serving as a bottom to the chamber. During this operation, the temperature of the liquor flowing from the chamber rises spontaneously, in about 20 minutes, from approximately 70° C. to about 150° C. As the washing is continued, the temperature then decreases. After thoroughly washing the sulphonated product with water to remove the sulphuric acid therefrom, an aqueous sodium carbonate solution of about 10 per cent concentration is added in amount exceeding that required to convert the sulphonated material to its sodium salt while stirring the mixture with air admitted through the porous bottom of the chamber. The aqueous solution of unspent sodium carbonate, and/or bicarbonate, is drained from the product through the porous bottom to the chamber, after which the product is again washed with water and the washings removed in similar manner. The product is then removed from the treating chamber and the latter is reemployed to treat a subsequent batch of the sulphonation mixture. Such repeated use of the chamber is continued until the filter plate, used as a bottom thereof, cracks, breaks, or crumbles. The aforementioned filter plate, made from a composition outside the scope of the invention, became so badly cracked after 34 days of such use, as a bottom of the treating vessel, that it had to be removed and replaced. In contrast, the filter plate, made from the composition prepared in accordance with the invention, withstood 113 days of similar use as a bottom to the treating vessel before replacement was necessary.

Other modes of applying the principle of the invention may be employed instead of those explained, change being made as regards the

I claim:

1. A plastic composition, having a property of hardening at room temperature to form a rigid, porous, acid-resistant article, which composition comprises a mass of calcined petroleum coke granules having outer surfaces thereof wetted with a mixture of a liquid, thermosetting phenol-formaldehyde condensation product, a resin-hardening catalyst comprising at least 40 per cent by weight of benzene sulphonyl chloride, and a substantially inert, finely-divided filler in amount sufficient to thicken the liquid phenol-formaldehyde condensation product and thus limit absorption of the same by the coke granules, said phenol-formaldehyde condensation product being present in amount sufficient for surface-wetting of the calcined petroleum coke granules, but insufficient to fill completely the interstices between said granules.

2. A composition, as described in claim 1, wherein the calcined petroleum coke granules are from 2 to 48 mesh size and the filler is of from 50 to 400 mesh particle size.

3. A composition, as described in claim 2, wherein the catalyst is benzene sulphonyl chloride.

4. A composition, as described in claim 2, wherein the catalyst is a mixture of trichloroacetic acid and benzene sulphonyl chloride containing at least 40 per cent of the latter.

5. A composition, as described in claim 2, wherein the filler is selected from the group consisting of graphite, non-graphitized carbon, and mixtures thereof.

6. A composition, as described in claim 2, wherein the filler is silica.

7. A composition, as described in claim 1, wherein the calcined petroleum coke is in the form of granules of from 5 to 10 mesh size and the composition comprises from 41.6 to 75 parts by weight of such coke, from 23.1 to 11.0 parts of the liquid phenol-formaldehyde condensation product, from 31.5 to 12.6 parts of the filler in the form of particles of from 50 to 400 mesh size, and from 3.8 to 1.4 parts of the catalyst.

8. A plastic composition, having a property of hardening at room temperature to form a rigid, porous, acid-resistant article, which composition comprises an intimate mixture of from 48.8 to 75 per cent by weight of calcined petroleum coke in the form of granules of from 2 to 48 mesh size, from 23.1 to 11 per cent of a liquid, thermosetting phenol-formaldehyde condensation product, from 24.3 to 12.6 per cent of a filler selected from the group consisting of graphite, non-graphitized carbon, and mixtures thereof in the form of particles of from 50 to 400 mesh size, and from 3.8 to 1.4 per cent of a resin-hardening catalyst containing at least 40 per cent by weight of benzene sulphonyl chloride.

9. A plastic composition, having a property of hardening at room temperature to form a rigid, acid-resistant porous article, which composition comprises an intimate mixture of from 50 to 68.6 per cent by weight of calcined petroleum coke in the form of granules of from 2 to 48 mesh size, from 16.9 to 11.0 per cent of a liquid thermosetting phenol-formaldehyde condensation product, from 30.7 to 19.0 per cent of silica in the form of particles of from 80 to 400 mesh size, and from 2.4 to 1.4 per cent of a resin-hardening catalyst containing at least 40 per cent by weight of benzene sulphonyl chloride.

10. A composition, as described in claim 9, wherein the catalyst contains from 45 to 75 per cent by weight of benzene sulphonyl chloride and from 55 to 25 per cent of trichloroacetic acid and is present in amount corresponding to from 2.4 to 1.4 per cent of the weight of the composition.

11. A rigid, porous article consisting of the composition of claim 1 in hardened condition.

12. A rigid, porous article consisting of the composition of claim 8 in hardened condition.

13. A rigid, porous article consisting of the composition of claim 9 in hardened condition.

14. A rigid, porous article consisting of the composition of claim 10 in hardened condition.

15. A method of making a rigid, acid-resistant, porous article which comprises admixing, with a liquid, thermosetting phenol-formaldehyde condensation product, a resin-hardening catalyst containing at least 40 per cent by weight of benzene sulphonyl chloride, and a substantially inert, finely-divided filler in amount sufficient to thicken the condensation product, and thereafter adding calcined petroleum coke granules of from 2 to 48 mesh size in amount such as to be surface-wetted by the liquid phenol-formaldehyde condensation product without complete filling of the interstices between said granules, the last-mentioned addition being made by adding as a single portion about one-third of the coke to the mixture of the other ingredients, stirring the mixture, and thereafter adding the remainder of the coke with stirring, shaping the resultant composition, and causing it to harden by standing.

ALVIN M. EDMUNDS.

No references cited.